Dec. 4, 1951 C. D. PETERSON 2,577,480
GAS SERVICE PRESSURE REGULATOR
Filed March 27, 1947 2 SHEETS—SHEET 1
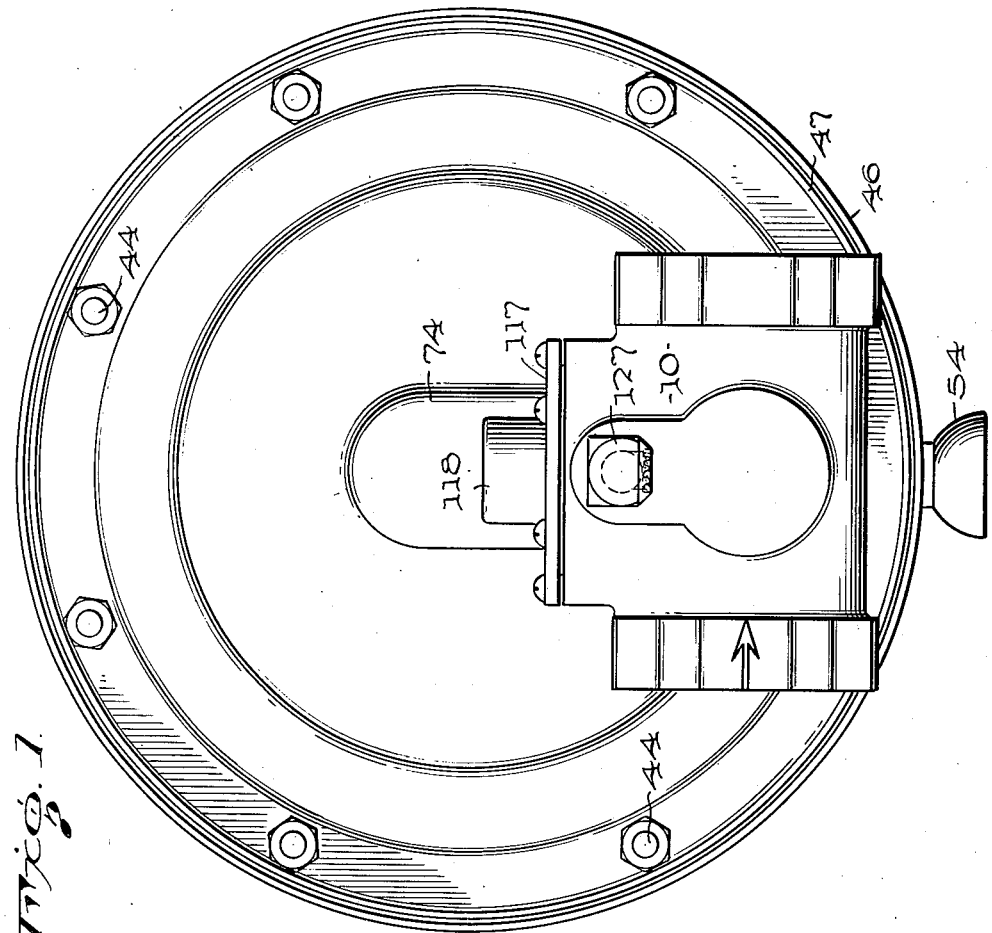
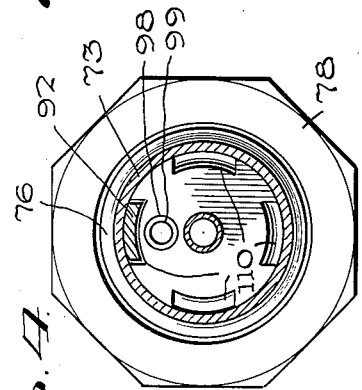
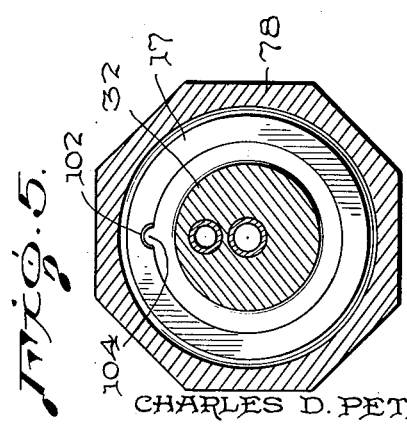
Inventor
CHARLES D. PETERSON
By
Leech & Radue
Attorneys

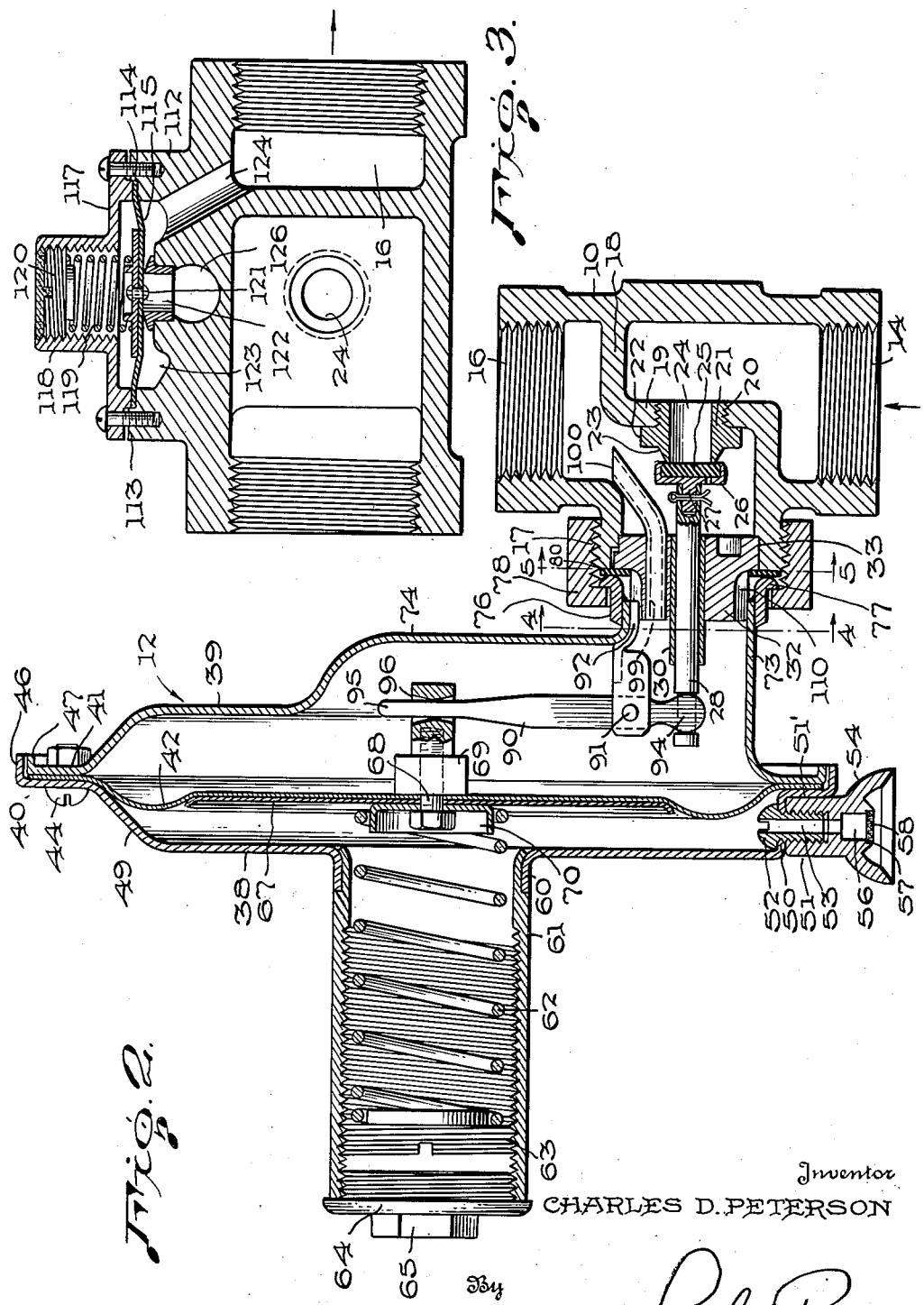

Patented Dec. 4, 1951

2,577,480

UNITED STATES PATENT OFFICE 2,577,480

GAS SERVICE PRESSURE REGULATOR

Charles D. Peterson, Dallas, Tex., assignor to Universal Controls Corporation, Dallas, Tex., a corporation of Texas Application March 27, 1947, Serial No. 737,656

17 Claims. (Cl. 50—26)

1

This invention relates to pressure regulators, and more particularly to gas service pressure regulators for interpositioning between a main or other source of gas and a consumer's service line to maintain a uniform and lower pressure on the service line under all conditions of main pressure and consumption load.

It is a general object of the present invention to provide a novel and improved gas service regulator.

More particularly it is an object of the invention to provide in a gas service pressure regulator of the diaphragm actuated type a construction in which the diaphragm is always maintained vertical and properly oriented irrespective of the direction of gas flow and the lead of the service line, whereby the diaphragm back face always drains properly at all times and eliminates danger of condensate freezing thereon.

Another important object of the invention comprises the arrangement of a gas service pressure regulator having a diaphragm and diaphragm housing relatively rotatably attached to the regulating valve body in a manner permitting the diaphragm to be maintained vertical and with the single diaphragm rear face drain at the lowermost position, while the valve body may accommodate horizontally or vertically disposed service pipes with the gas flow directed to the right or left or up or down.

Another important object of the invention resides in the use of a pitot tube for connecting the operating diaphragm-chamber to a high velocity area in the outlet side of the valve body for insuring adequate gas service pressure increases to compensate for high demand flow and in which novel means is used for locating and positioning this tube.

As an important feature of the invention may be mentioned the means for associating and attaching the cooperating necks on the valve body and lower diaphragm case whereby relative rotation of the two may be effected for service pipe directional adjustment purposes.

Another important feature comprises the arrangement of a valve stem guide disposed in the cooperating neck portions and mounting the pitot tube and the use of special orienting means between the body neck and the valve stem guide to insure accurate positioning of the pitot tube outlet.

A still further important feature of the invention resides in the arrangement of cooperating elements on the lower diaphragm case neck and the valve stem guide piece to insure indexed relative positioning of these parts whereby the diaphragm drain can be arranged to remain at the lowest point of the diaphragm housing and the axis of the valve body inlet and discharge ports may be changed to comply with the service pipe directional requirements.

One further feature of the invention needs particular emphasis, and that is the safety pressure relief valve arranged directly on and cooperating with the discharge port of the valve body whereby rapid release of excess gas pressure to the atmosphere is insured under all conditions.

Other and further objects and features of the invention will be more apparent to those skilled in the art upon a consideration of the accompanying drawings and following specification, wherein is disclosed a single exemplary embodiment of the invention, with the understanding that such changes and modifications may be made therein as fall within the scope of the appended claims without departing from the spirit of the invention.

Fig. 1 is an elevation of a gas service pressure regulator constructed in accordance with the present invention, the view being taken from the valve body side thereof, with this body disposed for gas service pipe disposition horizontally with flow from left to right;

Fig. 2 is a central vertical section through the regulator of Fig. 1, with, however, the valve body disposed for vertical service pipe disposition with flow from bottom to top;

Fig. 3 is a vertical central section through the valve body taken in a plane parallel to the operating diaphragm;

Fig. 4 is a vertical section on line 4—4 of Fig. 2, looking in the direction of the arrows and illustrating the indexing means between the lower diaphragm case neck and the valve stem guide piece; and Fig. 5 is a section taken on line 5—5 of Fig. 2, looking in the direction of the arrows, illustrating the orienting means for determining the location of the valve stem guide piece and its pitot tube in the valve body neck.

The uses and purposes for which gas service pressure regulators are designed and constructed are too well known to need recounting here. It may be said, however, that the majority of gas service pressure regulators are designed and constructed with certain arrangements and dispositions of the several parts fixed in accordance with the most commonly found directional alignment of the gas service pipe leading to the average dwelling.

Among these dispositions is the horizontal arrangement of the operating diaphragm which is undoubtedly a carry-over from the old weight operated regulators. Obviously the arrangement with the weight disposed directly on the surface of the diaphragm was the simplest and cheapest construction. With the increasing popularity of spring loaded diaphragms, however, there has been no real call for a horizontal disposition thereof, but inertia and an indisposition to redesign the conventional construction have resulted in the majority of the present day regulators being so constructed. In most of these the upper face of the diaphragm is the so-called back or inoperative face, which is exposed to the pressure of the atmosphere. In order to house the spring and to protect the diaphragm, the rear or upper diaphragm case encloses this face of the diaphragm and must be vented to insure atmospheric pressure on the back face of the diaphragm. In certain climates there is considerable condensation of moisture in this upper housing and on the back face of the diaphragm because of the breathing resulting from motion of the diaphragm. Such moisture tends to foul the housing and in the event of exposed regulators and cold weather freezing occurs, which prevents or seriously limits the motion of the diaphragm and vitiates the operation of the regulator.

To overcome these and other undesirable conditions it is proposed herein to arrange the diaphragm in the vertical plane to insure rapid condensation run off, and to also provide a single combined drain and breather for the back cover. Such drain must always be disposed at the lowest part of the housing to insure complete elimination of the water. The vertical disposition of the diaphragm insures complete drainage of its back face and the lower position of the drain insures removal of all moisture from the back casing. If the valve body, however, forms a portion of the diaphragm housing or is rigidly attached thereto, then this required disposition of the drain and diaphragm rigorously limits the use to a service pipe running in the fixed direction of the inlet and outlet in the valve body. This either complicates the piping or necessitates the manufacture of several models, both of which are uneconomical. In accordance with the present invention a rotatable joint is provided between the independent valve body and the diaphragm and its housing, which permits adjustment between these parts to accommodate vertically or horizontally disposed service pipes with flow in either direction in either one of them.

Referring now to the drawings, the invention will be seen to comprise generally the regulating valve body 10 with its cooperating parts and the diaphragm and its housing 12 with suitable cooperating parts.

The valve body is in the nature of a T having aligned inlet and discharge ports 14 and 16 and a neck 17 arranged at right angles to the axis thereof. The neck is externally threaded while the ports are internally threaded. A serpentine partition 18 divides the inlet port from the discharge port and neck and includes a flat portion 19 whose plane is parallel to the axis of the ports and at right angles to the axis of the neck. This portion is drilled and tapped at 20 coaxial to the neck to receive the non-ferrous seat member 21, which is threaded therein from the neck end and has a hexagonal flange portion 22 and a tapered cap section 23 meeting the central bore 24 in a sharp edged annulus, upon which is adapted to be seated a semi-rigid valve disc 25 crimped into the valve carrier cup 26 having a central stud 27 extending from its back face and housed in and attached to the right hand of a valve stem 28. The connection is by means of a cotter pin or similar fastener, as shown, so that a new carrier cup and disc may be applied when necessitated by wear. The valve stem is preferably a cylindrical rod and is closely guided for reciprocation in a valve stem guide tube 30 rigidly mounted in the axial center of a valve stem guide piece 32 preferably molded of some suitable plastic material or composed of a die casting whose inner end is closely received in a counterbore 33 in the neck 17, as shown. This not only supports it rigidly but its fit against the bottom of the counterbore is substantially gas-tight.

The diaphragm housing 12, which may be completely detached from the valve body, includes two dished circular cases 38 and 39 having radial flanges 40 and 41 respectively, adapted to be clamped together over the peripheral edge of a suitable flexible diaphragm 42 by means of an appropriate set of screws and nuts 44. To insure accurate alignment of the parts and the centralization of the diaphragm during assembly an annular flange 46 is formed on the periphery of the radial flange 40 to receive the corresponding annular flange 47 extending from radial flange 41. Flanges 46 and 47 are suitably sized to nest closely.

The outer flange 46 performs a second and very important function of protecting the edge of the diaphragm from the sun's rays, from moisture, freezing, etc. The diaphragms being made of coated fabric are subject to deterioration and rotting from exposure to the elements as occurs where edge protection is omitted. The inner flange 47 likewise serves a dual purpose, for the hexagon nuts on screws 44 each have one side thereof bearing on this flange to prevent rotation and eliminate the need for a wrench when assembling the housing.

The upper or outer diaphragm case 38 is a shallow saucer as shown, with an inclined area 49 extending from the flat central portion thereof down to the radial flange. This area is distorted throughout a short arc, as shown at 50, to provide a flat seat for the inner end of combined drain and breather fitting 51, shown positioned at the lowest portion of the case by means of the drain screw 52, comprising a conventional machine screw centrally drilled through the shank and head as shown at 53. It is received into the neck of the drain fitting, which is provided with a flaring bell 54 open at the bottom and bored in alignment with the center opening in the drain screw, and counterbored at 56 and again at 57 to receive the small disc of wire screen 58 to keep out insects and dirt. It will be seen that this drain, if always positioned as shown, will be at the lowest portion of the upper or outer diaphragm case and will insure complete drainage of any moisture therefrom. To prevent removal of the fitting 51 from the outside, it is provided with a flat side 51' closely engaging the case wall to prevent relative rotation.

There is a large central opening in the case 38 and the material from the opening is flared up and out into a circumferential flange 60 within which a reduced portion of the cylindrical tube 61 is received, flared and welded as shown.

This tube 61, which is threaded for most of its internal length, constitutes a housing for the helical spring 62 which loads the diaphragm. The spring loading is regulated by means of an adjusting screw or follower 63 externally threaded to fit the interior of the tube and fitted with a kerf and if desired also a hexagonal recess to permit engagement by suitable adjustment tools. A threaded closing cap 64 having an overhanging flange and nut 65 on the head serves to cover this adjusting screw and may be fitted, along with the tube, with drilled webs to receive a sealing device wire, not shown.

The diaphragm 42 is stiffened and reinforced through a major portion of its area by a central backing disc 67 to provide for peripheral flexing only. This disc is attached and clamped to the diaphragm by means of a cap screw 68, which screws into the pusher port 69 after passing through the diaphragm and backing plate as well as the spring positioning cup 70 which centralizes the inner end of spring 62 on the backing plate.

The lower or inner diaphragm case likewise has a main or central flat portion and the intermediate portion leading down to the radial flange 41. There is a neck 73 pressed out from the metal of the case in its border area and merged with the remainder of the case by a diametrically disposed trough-like portion 74, the purpose of which will be apparent later. The neck is slightly smaller than the bore of the neck of the valve body and has slipped over it and welded as shown the spigot portion 76 provided with the end flare or flange 77 serving to retain in position the union nut 78, whose smaller bore fits over the spigot and whose flange bears beneath the flared portion 77. The internal threads of the union nut engage the threads on the neck of the valve body, and with the aid of an interposed gasket 80 form a gas-tight joint between the two necks. The portion of the valve stem guide piece 32 projecting out from the neck of the valve body is reduced in diameter for an easy fit into the neck 73 of the lower diaphragm casing and to cooperate with the gasket as shown to hold the piece tightly in the body neck.

To impart motion from the diaphragm and its pusher post to the valve stem 28 a lever 90 is fulcrumed at 91 between its ends in a folded metal stamping, forming a lever supporting and positioning means. This stamping has an extension 92 which lies along the inner face of the neck 73 in the uppermost portion thereof and is welded or otherwise attached thereto, providing a rigid support for the fulcrum of the lever. The lower end of the lever is stamped to a circular form as seen at 94, which fits closely between the two ends of a deeply milled slot in the valve stem 28. The upper end of the lever is reduced to a narrow, parallel sided portion 95, which passes through an hour glass opening 96, transversely arranged in an extension of the pusher post 69. The smallest portion of this opening engages lever portion 95 with a close working fit. Thus any minute movement of the diaphragm is transferred in a reduced degree to the valve stem and changes the relative position of the valve disc and valve seat. The channel 74 in the case 39 provides clearance for the lever and associated parts.

The chamber in the lower diaphragm case must be connected to the discharge side of the valve body so that the pressure of gas being delivered for direct consumption is in control of the diaphragm position and hence the degree of opening of the valve. An ordinary bore through the valve stem guide piece would satisfy simple conditions so that if an increase in pressure occurred at 16 the diaphragm would be moved to the left and the lower end of the lever to the right to partially close the valve and lower the pressure. A decrease in pressure at 16 produces the reverse effect. A balanced condition is thus normally achieved, but where high demand for gas occurs, friction in the pipe line between the valve body and the appliance may serve to lower the pressure at the appliance below the desired value without having a corresponding effect at the regulator and on the position of the diaphragm, and thus unsatisfactory operation of the appliance may result. To compensate for this a bore is provided in the valve stem guide piece parallel to the valve guide tube, and is fitted with a Pitot tube 99, as shown in Fig. 2. The valve body end of this tube is bent upwardly and cut off horizontally, as seen at 100, well up into the discharge port of the valve body. The Pitot tube, ending in a restricted area between the barrier wall 19 and the side of the valve body thus encounters higher velocity gas during large demands. This flows past the clipped open end of the Pitot tube, which is directed substantially in the direction of the gas flow, whereby a moderate aspirating effect is achieved, thereby lowering the pressure in the chamber of the lower diaphragm casing to less than the static pressure in the discharge port 16 and thus compensates for friction losses in the pipes during high demands.

Obviously, for optimum operation, the Pitot tube must be positioned exactly as illustrated and to insure this, means for orienting the valve stem guide piece in the body neck 17 comprises a longitudinally milled groove 102 in the side wall of the counterbore 33 and a correspondingly shaped ridge or projection 104 on that portion of the valve stem guide piece which is received in the counterbore. Thus there can be but one positioning of this piece in the neck.

Since gas service lines usually extend either vertically or horizontally, it is desired that relative rotation for adjustment purposes may be achieved between the two abutting necks 17 and 73. Two positions, however, are not adequate because sometimes the gas flows down and sometimes up in a vertical pipe and it may flow from left to right or right to left in a horizontal pipe. Provision is therefore made to index the valve body in respect to the diaphragm case in 90° steps starting, for instance, from a position in which the axis of the body ports is parallel to the vertical radius through the drain or breather tube.

This is readily achieved by providing four 90° spaced longitudinal grooves 110 in the portion of the valve stem guide piece which projects outwardly from the valve body neck. These are of the appropriate size and shape so that the selected one closely cooperates with and receives the extension 92 on the lever support and positioning device, which, it will be remembered, projects into the neck 73 on the lower diaphragm case. The arrangement as disclosed in Fig. 2 is best seen in Fig. 4. By loosening the union nut the parts can be sufficiently separated to permit adjustment to any of the 90° indexed positions but all the while the exact positioning of the pitot tube is assured by the cooperating ridge and groove 104, 102. Clearly another form of lug except an extension of the lever support may be provided for reception in the selected one of grooves 110.

To prevent damage which might result from excess service pressure in the event of some failure of the regulator valve, such as could occur by the lodging of a piece of foreign matter between the valve disc and its seat or from some other cause, a pressure relief device is formed directly on the valve body, as seen in Fig. 3. One side of the valve body is extended, as seen at 112, and is faced off at 113 and counterbored as at 114 to provide a seat for the edges of the flexible diaphragm 115, which is clamped in position by a cooperating flange on bonnet 117 having a centrally disposed neck 118 for housing the spring 119 and its adjusting nut 120 in quite the same manner as the main spring for diaphragm 42. A combined backing plate, diaphragm head and spring seat is attached in the center of this smaller diaphragm by a hollow rivet 121. The relatively soft material of the diaphragm is held down by the spring 119 onto the sharp upper edge of the pressed-in valve seat insert 122. The diaphragm thus effectively closes the chamber 123 which is connected by passage 124 to the outlet port 16. Upon the occurrence of excess pressure in discharge port 16, however, the pressure in chamber 123 goes up sufficiently to lift the diaphragm against the spring and raise it from the edge of seat 122, allowing gas to be discharged through the bore in this seat and out through the lateral bore 126 to the outside of the valve body, through the screened waste plug 127, seen in Fig. 1. The operation of this device will be obvious and the adjustment to suitable pressures is effected by nut 120, which can, if desired, be covered with a cap such as 64 for the main spring adjusting nut. It is simpler and preferred however to fill the tube 118 above the adjusting nut 120 with sealing wax to prevent tampering. This forms an airtight chamber above the diaphragm which is vented through the hollow rivet to atmosphere so that temperature changes do not affect relief setting.

It will be seen that the arrangement of the relief valve directly on the valve body eliminates the requirement that the excess pressure gas which is to be relieved pass through the pitot tube to get to the lower diaphragm case where the relief valve is usually mounted. Thus there is no restriction to the capacity of the relief valve to vent gas to reduce excess pressure except its own size. By being installed as a component part of the valve body the relief valve can be large and the gas passage short and of considerable size so that large capacity is available.

I claim:

1. A gas service pressure regulator comprising in combination, a valve body having opposed inlet and discharge ports, a circular diaphragm extending in a plane parallel to the axis of said ports and adapted to be vertical under all conditions of valve body mounting, a lower diaphragm case and an upper diaphragm case together clamping the edges of said diaphragm, a single, edge-positioned drain and breather on the upper case and operable fully only when positioned at the bottom of the upper case, cooperating necks on the valve body and the lower diaphragm case meeting in a plane parallel to the diaphragm, and a union connecting said necks whereby the valve body can be positioned for gas flow in any of a plurality of directions in a vertical plane while the diaphragm remains vertical and the drain is at the bottom.

2. The regulator defined in claim 1 in which the valve body has a valve seat coaxial to its neck, a valve stem guide piece removably fitted in said neck, and a valve stem extending centrally through said guide piece for actuation by said diaphragm.

3. The regulator as defined in claim 2 in which a pitot tube extends through said guide piece and into cooperative relation to said body discharge port and means is provided to insure correct orientation of the guide piece and neck.

4. The regulator as defined in claim 3 in which the lower diaphragm case neck and the said guide piece are provided with cooperating elements to determine the relative positions of the ports axis and the drain radius.

5. A gas service pressure regulator comprising in combination, a valve body having opposed inlet and discharge ports, a circular diaphragm extending in a plane parallel to the axis of said ports and adapted to be vertical under all conditions of valve body mounting, a lower diaphragm case and an upper diaphragm case together clamping the edges of said diaphragm, a single, edge-positioned drain and breather on the upper case and constructed and arranged to operate fully only when positioned at the bottom of the upper case, cooperating necks on the valve body and the lower diaphragm case meeting in a plane parallel to the diaphragm, a union connecting said necks whereby the valve body can be positioned for gas flow in any of a plurality of directions in a vertical plane while the diaphragm remains vertical and the drain is at the bottom, the neck on the lower diaphragm case being offset from the center thereof in the direction of said drain.

6. The regulator as defined in claim 5 in which a valve stem extends coaxially through said necks, a lever having one end in cooperating engagement with said stem, means on said diaphragm having cooperating engagement with the opposite end of said lever, and a lever support and fulcrum secured to said lower diaphragm case.

7. The regulator as defined in claim 6 in which a valve stem guide extends into both necks, means to orient said guide in a single position in the body neck and means on said other neck and the guide to engage in any one of four positions 90° displaced.

8. The regulator as defined in claim 7 in which one of said positions parallels the ports' axis and the vent radius with the discharge port arranged upward.

9. The regulator as defined in claim 7 in which the engaging means on the other neck is a portion of said lever support and fulcrum.

10. A pressure regulator including in combination, a diaphragm, upper and lower diaphragm cases enclosing and supporting the diaphragm, a single combined drain and breather at the edge of the upper case, a neck extending from the lower case with its axis normal to the plane of the diaphragm, a valve body having aligned inlet and discharge ports and a neck having its axis normal to the axis of the ports, a union nut on one of said necks to engage the other and secure them in alignment, a valve stem operatively connected to said diaphragm and extending axially through said necks, a valve stem guide piece removably extending into both necks to close off flow therethrough and having a stem guide opening therein, and means on said guide piece and said necks cooperating to fix the orientation of the ports' axis in respect to the said drain, a valve housing carried by one of said case parts, a valve in said housing, a spring carried by one of said case parts and biasing the valve toward open position, means associating the valve and diaphragm to actuate the former from the latter, and a restricted passage from the outlet side of the valve to the case part on that side of the diaphragm where pressure will tend to close the valve.

11. A pressure regulator including in combination, a diaphragm, upper and lower diaphragm cases enclosing and supporting the diaphragm, a single combined drain and breather at the edge of the upper case, a neck extending from the lower case with its axis normal to the plane of the diaphragm, a valve body having aligned inlet and discharge ports and a neck having its axis normal to the axis of the ports, a union nut on one of said necks to engage the other and secure them in alignment, a valve stem operatively connected to said diaphragm and extending axially through said necks, a valve stem guide piece removably extending into both necks to close off flow therethrough and having a stem guide opening therein, a pitot tube extending through said guide piece and having a curved end for disposition near the discharge port, and cooperating means on said valve body neck and piece to fix their orientation so as to properly locate the pitot tube end.

12. The regulator as defined in claim 11, in which the other neck and piece are provided with selective indexing means to fix their relative positions.

13. The regulator as defined in claim 12, in which the indexing means comprises a plurality of longitudinal grooves in said piece and a lug in said case neck adapted to engage in any one of them.

14. A pressure regulator including in combination, a diaphragm, upper and lower diaphragm cases enclosing and supporting the diaphragm, a single combined drain and breather at the edge of the upper case, a neck extending from the lower case with its axis normal to the plane of the diaphragm, a valve body having aligned inlet and discharge ports and a neck having its axis normal to the axis of the ports, a union nut on one of said necks to engage the other and secure them in alignment, a valve stem operatively connected to said diaphragm and extending axially through said necks, a partition in said body between said ports and having an opening and valve seat therein, said seat being in a plane parallel to that of the diaphragm, a combined valve stem guide and neck closure, a counterbore in the body neck adapted to receive said closure, a pitot tube eccentrically mounted in and extending through said closure and having an end formed to cooperate with gas flowing in the discharge port and means to orient said closure in said neck.

15. The regulator as defined in claim 14 in which the said closure extends into the neck on the diaphragm case, and means on said last mentioned neck and on said closure for indexing the relative orientation of said two necks to a plurality of predetermined positions.

16. In a gas service pressure regulator, in combination, a diaphragm, a casing for one side thereof having a neck normal to the plane thereof, a T-shaped valve body, means coupling the stem of said body to said neck, inlet and outlet ports at the ends of the cross of said body, a separator between said ports, a valve seat in said separator coaxial with said stem, a valve for said seat, means passing through said stem connecting the diaphragm and valve, an outwardly open chamber in said body having its axis normal to the axes of the stem and cross of the body, a passage from the outlet port to said chamber, a valve seat centrally of said chamber, a diaphragm closing said chamber, means biasing said second diaphragm against said second valve seat and a discharge passage opening through said last mentioned seat and extending through the wall of said housing opposite to said stem.

17. The pressure regulator defined in claim 16 having a vent device threaded into said discharge passage, said device having an opening directed laterally to the axis of said passage, said device being rotatable in said passage whereby the opening may be directed downwardly in spite of the direction of run of the valve-cross when the first diaphragm is mounted vertically.

CHARLES D. PETERSON.

REFERENCES CITED

The following references are of record in the file of this patent:

UNITED STATES PATENTS

| Number | Name | Date |
|---|---|---|
| 687,002 | Cash | Nov. 19, 1901 |
| 1,546,047 | Thrall | July 14, 1925 |
| 1,931,777 | Thrall | Oct. 24, 1933 |
| 2,156,823 | Stettner | May 3, 1939 |
| 2,320,191 | Mott | May 25, 1943 |
| 2,376,892 | Avigdor | May 29, 1945 |